United States Patent [19]

Howell

[11] 4,014,654

[45] Mar. 29, 1977

[54] APPARATUS FOR PRODUCING CARBON BLACK

[75] Inventor: Ronald Lee Howell, Baytown, Tex.

[73] Assignee: J. M. Huber Corporation, Locust, N.J.

[22] Filed: Feb. 18, 1975

[21] Appl. No.: 550,323

Related U.S. Application Data

[63] Continuation of Ser. No. 316,764, Dec. 20, 1972, abandoned.

[52] U.S. Cl. .................. 23/259.5; 423/450; 423/455; 239/428; 23/277 R; 431/187
[51] Int. Cl.² .................. C09C 1/48; F23C 7/00
[58] Field of Search ............ 23/259.5, 277 R; 423/450, 455, 456, 457, 458; 239/428

[56] References Cited

UNITED STATES PATENTS

| 2,801,157 | 7/1957 | Campbell et al. | 423/456 |
| 2,917,370 | 12/1959 | Edminster et al. | 423/455 |
| 3,353,915 | 11/1967 | Latham, Jr. et al. | 423/450 |
| 3,607,058 | 9/1971 | West et al. | 23/259.5 X |
| 3,755,543 | 8/1973 | Latham, Jr. | 423/450 |

Primary Examiner—James H. Tayman, Jr.
Attorney, Agent, or Firm—Harold H. Flanders; Robert L. Price

[57] ABSTRACT

An apparatus for producing an extended structure SRF carbon black having good rubber reinforcing properties is disclosed. The apparatus comprises a unique burner which supplies combustion fuel gases in two separate areas of the burner and permits selective regulation of the respective amounts of fuel gas in the air and additional fuel gas. The burner can be used to make an extended structure SRF carbon black or other grades of carbon black in the same furnace merely by changing the amounts of fuel gas and additional fuel gas.

6 Claims, 2 Drawing Figures

APPARATUS FOR PRODUCING CARBON BLACK

REFERENCE TO RELATED APPLICATIONS

This is a continuation of application Ser. No. 316,764, filed Dec. 20, 1972 now abandoned.

BACKGROUND OF THE INVENTION

The present invention relates to the production of carbon black and, more particularly, to a method and apparatus for producing an extended structure SRF grade carbon black.

As is known in the art, semi-reinforcing furnace carbon blacks (SRF) are those which meet or fall within the specification set out in ASTM designation N761. In this regard, a number of prior art methods have been proposed and developed for producing a standard SRF grade of carbon black having a DBP oil absorption value of approximately 100. A higher structure of SRF carbon black, with DBP values in the range of 105–110 has also been produced by using feedstock additives and carefully controlling the air, fuel gas, and feedstock flow rates. Some relatively high structure carbon black has also been produced in furnaces with combustion chambers of a particular configuration. None of these prior art techniques have, however, been successful for producing an SRF carbon black with an extended structure, i.e., DBP oil absorption value as high as 130, without sacrificing the rubber reinforcing qualities of the carbon black.

SUMMARY OF THE INVENTION

In summary, the present invention overcomes the deficiencies of the prior art by providing a unique method for producing an extended structure SRF carbon black having good rubber reinforcing properties and an apparatus including a unique burner assembly for producing the said extended structure SRF carbon black. More specifically, it has been found that an extended structure SRF carbon black with other desirable rubber reinforcing characteristics can be obtained from a substantially additive free feedstock by flowing a mixture of fuel gas and air toward a sprayed feedstock oil and by flowing a stream of fuel gas between the fuel-air mixture and the oil spray. This technique results in the desired degree of combustion to produce the extended structure SRF carbon black with the required characteristics.

The invention also relates to a unique burner assembly having a feedstock nozzle, a first fuel gas outlet for flowing a controlled quantity first fuel gas stream around the feedstock oil sprayed from the nozzle, and a second outlet upstream from the nozzle for flowing a controlled quantity second fuel gas stream into the usual combustion air stream flowing toward the nozzle from the inlet end of the furnace with which the burner assembly is used. In accordance with a particularly advantageous embodiment of the invention, the burner assembly includes a plurality of concentric conduits for discharging the first and second streams of fuel gas at the required locations and for spraying the feedstock oil.

A distinct additional advantage of the burner of this invention is that it permits production of carbon black of standard, high and extended structure carbon black in the same furnace merely by adjusting control valves to regulate the quantity of fuel gas discharged adjacent the nozzle and at the upstream location. For the production of some forms of carbon black all the fuel gas can be introduced at only one location.

The extended structure SRF carbon black which can be formed with the apparatus of and in accordance with the method of this invention is formed efficiently and no significant problems of coke formation inside the furnace is encountered.

It is accordingly an object of the present invention to provide a unique burner for carbon black furnace having a first fuel gas outlet for flowing fuel gas around feedstock oil sprayed from a nozzle of the burner, and having a second fuel gas outlet for flowing fuel gas into combustion air flowing along the burner, and in which the quantity of fuel gas discharged from the first and second outlets can be separately and independently controlled.

A further object is to provide a unique method of forming an extended structure SRF carbon black with good rubber reinforcing characteristics by flowing a stream of fuel gas around feedstock oil sprayed from a nozzle and flowing a combustible fuel-air mixture toward and around the fuel gas stream and sprayed oil.

BRIEF DESCRIPTION OF THE DRAWINGS

The manner in which the foregoing and other objects are achieved in accordance with the present invention will be better understood in view of the following detailed description and accompanying drawings which form a part of the present specification and wherein.

DESCRIPTION OF THE PREFERRED EMBODIMENT(S)

Figure 1:
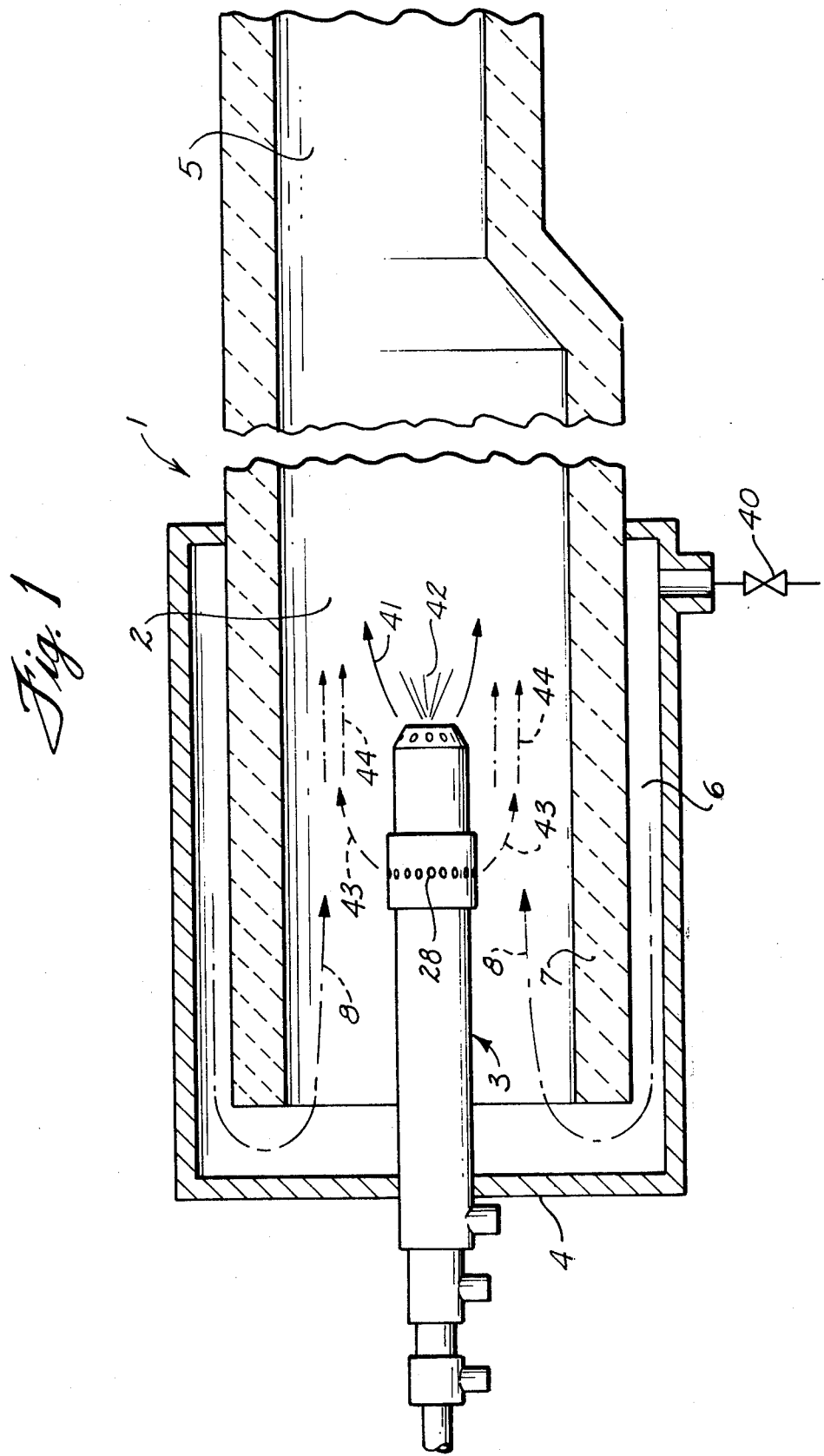
FIG. 1 is a side view in section showing a carbon black furnace with the improved burner assembly of this invention mounted therein, and showing schematically the air, fuel gas and oil spray in accordance with this invention.

Referring now to the drawings and with reference first to FIG. 1 there is shown a carbon black furnace 1 having a combustion chamber 2 and a gas burner assembly 3 extending through the inlet end 4 of the furnace. The furnace includes the usual downstream quench chamber 5 for cooling the carbon black formed in combustion chamber 2. Air to support the combustion of the fluids flowing from burner assembly 3 is flowed around the burner from the inlet end 4 of the furnace, for example, by flowing the air through passage 6 around the wall 7 of the combustion chamber 2 and then inwardly and along the body of the burner assembly 3 as shown by arrows 8.

Figure 2:
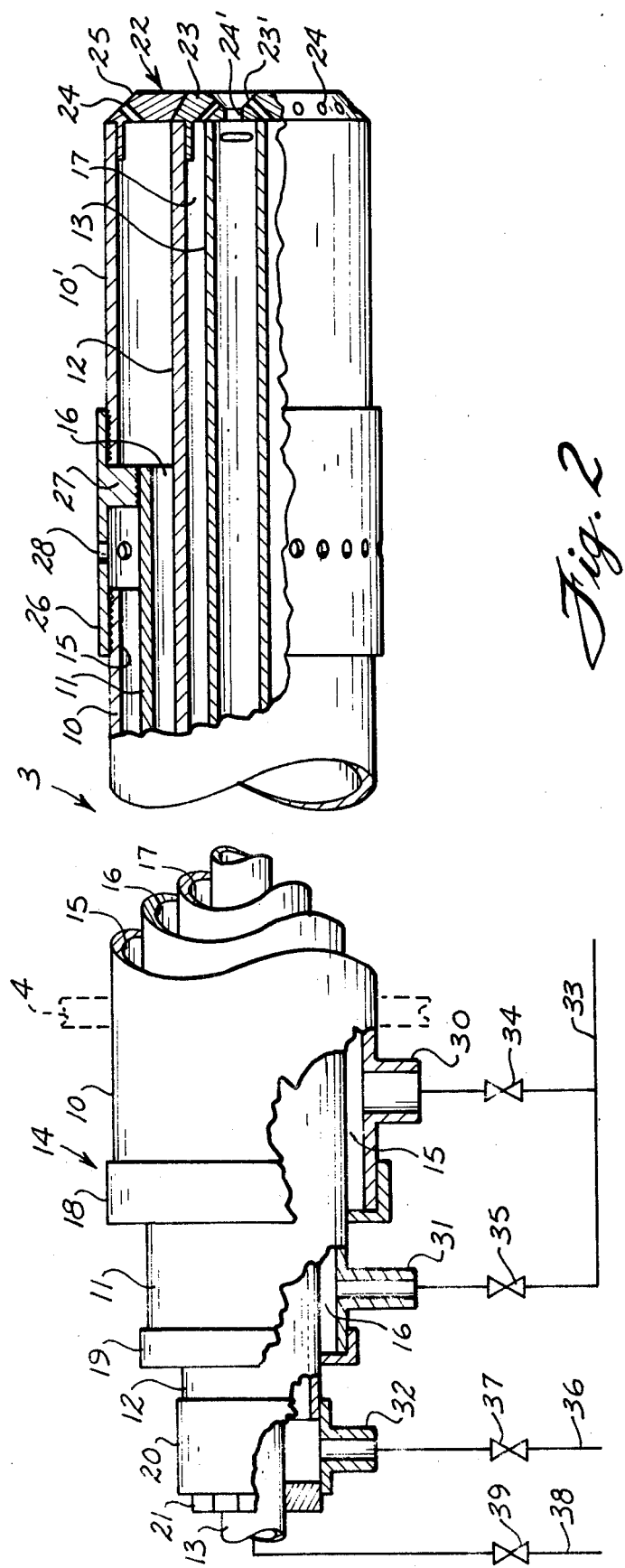
FIG. 2 is an enlarged side view in partial section showing the details of the gas burner assembly.

In accordance with the present invention and with referrence now to FIG. 2, there is shown a burner assembly 3 that includes a plurality of concentric conduits 10–13 disposed respectively within each other and which communicate with the outer end 14 of the burner assembly which is disposed outside the furnace. The respective inner and outer surfaces of side walls of the conduit 10–13 define annular passages 15–17.

At the outer end 14 of the burner assembly conduit 10 has an end cap 18 which seals against conduit 11 and closes the end of conduit 10. Conduit 11 has a similar end cap 19 which seals against conduit 12 and closes the end of conduit 11. Similarly, fitting 20 has a plug 21 which seals against conduit 13 and closes the outer end of conduit 12.

At inner end or nozzle 22 of the burner assembly is a spray nozzle 23 which communicates with the annulus 17 between conduits 12 and 13. Extending around spray nozzle 23 are a plurality of equally spaced fuel gas ports 24 formed in a gas nozzle 25 and which communicate with the flow 16 between the conduits 11 and 12.

Conduits 10 and 11 terminate at a location upstream from nozzle end 22 of the burner assembly. Conduit 10 is threadedly received in a sleeve 26 having an inwardly projecting flange 27 to receive the threaded end of conduit 11. Formed in sleeve 26 are a plurality of gas discharge ports 28 which lie in a common plane normal to the axis of the burner and are equally circumferentially spaced. Annular passage 15 communicates with ports 28 and terminates at flange 27. An extension 10' is threaded into the outer end of sleeve 26 and terminates at the gas discharge nozzle 25 which is connected to the extension.

Adjacent outer end 14 of the burner are transversely extending inlet pipes 30 and 31 which communicate respectively with annular passages 15 and 16. Fitting 20 has a transversely extending inlet section 32 which communicates with annular passage 17.

Burner gas piping 33 is connected to inlets 30 and 31 via suitable control valves 34 and 35 which are provided to separately and independently control the flow of fuel gas to the respective inlets 30 and 31. It is to be understood that piping 33 is connected to the usual source of fuel gas (not shown).

Piping 36 connects inlet 32 to a source of feedstock oil under pressure (not shown) and a control valve 37 is provided to control the flow of feedstock oil. Piping 38, provided with a control valve 39, connects conduit 13 with a source (not shown) of atomizing media such as pressurized air or steam.

In the operation of the furnace 1 in which burner assembly 3 is installed, air is introduced into the inlet end of the furnace via the annular passage 6. The air flowing along the outside of the shell 7 cools the shell defining combustion chamber 2 and also preheats the air. The air so introduced is combustion supporting air which flows along the outside of the burner assembly as shown by arrows 8. Feedstock oil introduced through control valve 37, inlet 32, and annular passage 17 flows to the spray nozzle 23 and through ports 23' where it is atomized and sprayed into combustion chamber 2 by the atomizing medium from the central conduit 13 which flows through opening 24' of the nozzle. A first supply of fuel gas flows from ports 24, and the quantity of this gas in controlled by regulating the control valve 34. Additional fuel gas flows through ports 28 from passage 15, and the quantity of this additional gas is controlled by control valve 35.

The air flowing through inlet annulus 7 can, of course, be controlled by a control valve 40 in the inlet piping for the air.

The fuel gas discharged from ports 24 forms an annular stream or blanket, as shown by arrows 41, around the feedstock oil 42 sprayed from nozzle 23. The air stream designated by arrows 8 flowing along the outside of the burner receives fuel gas, designated by arrows 43, from discharge ports 28 and the air and gas mix as they pass along the outside of the burner to form a combustible gas stream designated by arrows 44. This combustible gas stream is ignited to provide the heat necessary to crack the hydrocarbon feedstock oil to form the extended structure SRF carbon black. The stream 41 of fuel gas eminating from discharge ports 24 regulates the degree of combustion of the feedstock oil to obtain the extended structure carbon black.

It has been found that an extended structure SRF carbon black can be produced with the burner 3 by simultaneously flowing fuel gas through discharge ports 28 and 24 while spraying hydrocarbon feedstock oil from nozzle 23. In addition, a furnace equipped with burner assembly 3 can be used to produce carbon black of different structures in a range of DBP values of from 110–140. Hence, by using the burner 3 the same furnace can be used to produce carbon black of different structures merely by adjusting valves 34 and 35.

The following examples will serve to better illustrate the present invention. However it should be expressly understood that they are not intended to limit it thereto.

EXAMPLE 1

A Conico type feedstock oil at a temperature of 450° F was fed to conduit 12 at a rate of 1.41 gallons per minute. Atomizing gas was fed to central conduit 13 at a rate 5 scfm. The atomizing gas and feedstock oil mixed at the nozzle and the oil was sprayed into the combustion chamber. Control valves 34 and 35 were adjusted to discharge fuel gas at a rate of 25 scfm through both discharge ports 24 and discharge ports 28. The carbon black so formed was quenched at the quench section of the furnace. There was no appreciable coking in the furnace.

The properties of the manufactured carbon black of Example 1 were determined by tests and compared with ASTM specifications for an extended structure carbon black. The results are as follows:

TABLE 1

Comparison of manufactured black of Example 1 with ASTM specifications for extended structure SRF carbon black

|  | Specifications (ASTM) | Manufactured Black Ex. 1 |
|---|---|---|
| Iodine Adsorption, mg/g | 30 | 30 |
| DBP Absorption, cc/100 g | 130 | 128 |
| Nitrogen Adsorption, m²/g | 32 | 31 |
| Benzene Disc., % Minimum Trans. | 85 | 85 |
| Pour Density, lb/ft³ | 23 | 22 |
| 300% Modulus, psi   - 15' | +200 | +250 |
|   - 30' | +150 | +150 |
| Tensile, psi   - 15' | −575 | −550 |
|   - 30' | −575 | −600 |
| Elongation, %   - 15' | −50 | −60 |
|   - 30' | −50 | −50 |

It is apparent from Table 1 that the manufactured carbon black compares favorably with the ASTM specifications for an extended structure SRF carbon black. The iodine adsorption, DBP adsorption, nitrogen adsorption, and pour density are all within the acceptable range of the ASTM specification. Benzene discoloration, modulus, and tensile values of the manufactured carbon black are equal to or better than the corresponding ASTM specifications. Correspondingly, the manufactured carbon black of Example 1 meets or exceeds tire manufacturers specifications for an extended structure SRF carbon black.

A quantity of the highest structure commercially available SRF carbon black which came the closest to the ASTM specifications for an extended structure SRF black was obtained. The commercial black and the experimental black were compounded with rubber according to the ASTM recipe. Table shows the results of tests on the commercial black and manufactured black in this recipe.

TABLE 2

Comparison of Commercial Black and Manufactured Black in ASTM Recipe

|  |  | Commercial Black | Manufactured Black |
|---|---|---|---|
| Iodine Adsorption, mg/g |  | 34 | 31 |
| DBP Absorption, cc/100 g |  | 127 | 128 |
| Nitrogen Adsorption m²/g |  | 35 | 31 |
| Pour Density, lb/ft³ |  | 20 | 22 |
| Benzene Disc., % Trans |  | 82 | 95 |
| pH |  | 9.9 | 8.3 |
| 300% Modulus, psi | - 15' | 2040 | 2130 |
|  | - 30' | 2440 | 2470 |
| Tensile, psi | - 15' | 3340 | 3360 |
|  | - 30' | 3400 | 3350 |
| Elongation, % | - 15' | 470 | 470 |
|  | - 30' | 430 | 420 |
| Hardness, Shore A | - 15' | 64 | 66 |
|  | - 30' | 74 | 67 |
| Goodyear Rebound, % |  | 74 | 75 |
| Firestone Heat Build-up ° F |  | 210 | 215 |

From Table 2 it is apparent that the commercial black had an iodine adsorption level of 34 which is not within the limits of the ASTM specification level of 33. In addition, the manufactured black had a higher structure than the commercial black, exhibiting a DBP value of 128 compared with a DBP value of 127 for the commercial black. The nitrogen adsorption, poor density, and benzine discoloration were also superior in the manufactured black.

The commercial black and manufactured black were compounded with rubber in an LTP rubber recipe. Tests were conducted and the results are set forth in Table 3.

TABLE 3

Comparison Between Manufactured SRF and Commercial Black in LTP Recipe

|  |  | Commercial Black | Experimental Black |
|---|---|---|---|
| 300% Modulus, psi | - 30' | 1100 | 1170 |
|  | - 45' | 1650 | 1560 |
|  | - 60' | 1710 | 1780 |
|  | - 75' | 1870 | 1830 |
| Tensile, psi | - 30' | 2260 | 2310 |
|  | - 45' | 2700 | 2640 |
|  | - 60' | 2800 | 2700 |
|  | - 75' | 2800 | 2740 |
| Elongation, % | - 30' | 680 | 670 |
|  | - 45' | 540 | 590 |
|  | - 60' | 520 | 510 |
|  | - 75' | 500 | 500 |
| Hardness, Shore A | - 30' | 61 | 62 |
|  | - 45' | 63 | 64 |
| Goodyear Rebound (212° F), % |  | 69 | 70 |
| Firestone Heat Build-up, ° F |  | 259 | 262 |

The commercial black and the manufactured black were also used in a Carcass recipe, tests were again conducted, and the results are set forth in Table 4.

TABLE 4

Comparison Between Experimental SRF and Commercial Black in Carcass Recipe

|  |  | Commercial Black | Experimental Black |
|---|---|---|---|
| 300% Modulus, psi | - 6' | 1300 | 1300 |
|  | - 8' | 1490 | 1530 |
|  | - 10' | 1580 | 1620 |
|  | - 15' | 1630 | 1650 |
| Tensile, psi | - 6' | 2980 | 3060 |
|  | - 8' | 2900 | 2940 |
|  | - 10' | 2920 | 2900 |
|  | - 15' | 2860 | 2860 |

TABLE 4-continued

Comparison Between Experimental SRF and Commercial Black in Carcass Recipe

|  |  | Commercial Black | Experimental Black |
|---|---|---|---|
| Elongation, % | - 6' | 580 | 570 |
|  | - 8' | 520 | 510 |
|  | - 10' | 500 | 490 |
|  | - 15' | 480 | 480 |
| Hardness, Shore A | - 10' | 55 | 54 |
|  | - 15' | 55 | 54 |
| Firestone Heat Build-up, ° F |  | 191 | 189 |

Tables 2, 3, and 4 show that the manufactured black was at least equal to the commercial black in the ASTM, LTP, and Carcass recipes.

EXAMPLE 2

Additional runs were made in furnace 1 using the burner 3 to determine the effect of varying the quantity of burner gas discharged through front ports 24 and rear ports 28. All conditions were maintained the same as set forth in example 1, save that, the relative percentage of fuel gas through the port was varied. Runs were made varying the fuel gas from front ports 24 from 0 to 50 percent and varying the fuel gas from back ports 27 from 100 percent to 50 percent. One run was also conducted with no gas flowing from the back ports 28 and 100 percent gas flowing from front ports 24. The carbon blacks produced from these runs were tested and the results are shown in Table 5.

TABLE 5

| Run No. | % Burner Gas at Back Ports | % Burner Gas at Front Ports | Iodine Ads., mg/g | DBP Abs., cc/100 g | Color Trans.% | Coke |
|---|---|---|---|---|---|---|
| 1 | 100 | 0 | 30 | 140 | 70 | yes |
| 2 | 80 | 20 | 30 | 138 | 75 | yes |
| 3 | 60 | 40 | 31 | 136 | 85 | no |
| 4 | 50 | 50 | 31 | 128 | 85 | no |
| 5 | 40 | 60 | 30 | 126 | 85 | no |
| 6 | 30 | 70 | 29 | 120 | 75 | no |
| 7 | 0 | 100 | 22 | 113 | 34 | no |

While runs 1 and 2 of Table 5 produced carbon black with acceptable iodine adsorption and DBP Adsorption, benzine discoloration was low and there was substantial coke formation in the furnace. Run 3 produced a high structure carbon black with acceptable iodine adsorption and benzine discoloration characteristics. Run No. 4 is the same as Example 1 and is within the limits of the ASTM specification. Run No. 5 illustrates the formation of a standard carbon black having low benzine discoloration, low iodine adsorption and low DBP adsorption with a corresponding low structure.

Runs 1 through 5 do however illustrate that the same furnace can be used to produce carbon blacks of various structures and characteristics including an improved SRF extended structure carbon black. Hence, the same furnace can be used to produce carbon blacks of various structures and characteristics, and this can be accomplished simply by varying the relative percentage of fuel gas discharge through front ports 24 and back ports 28 by adjusting valves 34 and 35.

What is claimed is:

1. Apparatus for producing carbon black comprising:
   I. a furnace having a chamber;
   II. a burner assembly within said chamber including:

A. a plurality of co-extensive conduits including first, second and third conduits of successively smaller sizes, defining annular passages therebetween;

B. means for spraying feedstock oil into said chamber of said furnace, including means for mixing said feedstock oil with a vaporizing medium, including;
1. nozzle means at the end of said assembly within said chamber for spraying said feedstock oil and communicating with said third conduit, said conduit having an inlet remote from said nozzle,
2. means for mixing an atomizing medium with said feedstock oil including a fourth conduit within said third conduit and communicating with said nozzle,
3. means for flowing a vaporizing medium for said feedstock oil through said fourth conduit,
4. means for flowing said carbon black producing feedstock through the annulus between said third conduit and said fourth conduit;

C. first means for flowing a first stream of fuel gas around the sprayed feedstock oil from a location adjacent the location from which the feedstock oil is sprayed including a first passage means having an outlet adjacent said nozzle means for flowing fuel gas around the sprayed feedstock oil in an annular pattern and an inlet remote from said nozzle, said first means including:
1. a first, fuel gas outlet in close proximity to said nozzle and communicating with said first passage means comprising an annular passage between said second conduit and said third conduit, including a plurality of discharge ports extending around said nozzle,
2. means for flowing a fuel gas through said annulus between said second conduit and said third conduit,
3. means for separately controlling the flow of fuel gas from said first means forming said first stream, including first valve means connected to the annular passage between said first and second conduits for controlling the flow of fuel gas through said annular passage from said location adjacent the location from which the feedstock oil is sprayed;

D. second means upstream from said first means for flowing an air stream toward said first means and the sprayed feedstock oil, including means for flowing air from a location upstream of said first stream;

E. means for flowing a second stream of air and fuel gas around said first stream of fuel gas, including:
1. third means for flowing additional fuel gas into said air stream from a location upstream of said first stream and downstream of said air stream to mix air with said additional fuel gas to form said second stream,
   a. said third means including a second passage means having an outlet upstream from said nozzle opening into said chamber for flowing fuel gas into said air stream and an inlet remote from said nozzle,
   b. said third means being located between said first and second means and including a second fuel gas outlet means between said first outlet means and said inlet and remote from said first outlet means, said second fuel gas outlet means communicating with a second annular passage, said annular passage being between said first and second conduits and including a plurality of discharge ports extending around said burner assembly,
2. means for flowing a fuel gas through said annular passage between said first conduit and said second conduit; and F. means for separately controlling the flow of said additional fuel gas from said third means into said air stream including second valve means connected to the annular passage between said second and third conduits for controlling the flow of fuel gas through said annular passage.

2. An apparatus according to claim 1 wherein said nozzle means in (II) (B) (1) is a spray nozzle means having a central orifice, said fourth conduit is within said third conduit, and said mixing means of (II) (B) (2) is aligned and communicates with the central orifice of said spray nozzle with vaporizing medium flowing through the central orifice of said spray nozzle.

3. An apparatus according to claim 2 wherein said flow means of (II) (B) (4) for flowing feedstock through the annulus between said third conduit and said fourth conduit comprises a plurality of orifices adjacent to and surrounding the central orifice of said spray nozzle.

4. An apparatus according to claim 3 wherein said flow means of (II) (C) (2) includes means for flowing said fuel gas through said annulus between said second conduit and said third conduit and thence through said plurality of discharge ports extending around said spray nozzle.

5. An apparatus according to claim 4 wherein in (II) (E) (1) (b), said plurality of discharge ports extending around said burner assembly are circumferentially disposed around the periphery of the first and outer conduits of said burner assembly.

6. An apparatus according to claim 5 wherein in (II) (E) (2), said means for flowing fuel gas through said annular passage between said first conduit and said second conduit includes means for flowing said fuel gas through said plurality of discharge ports extending around said burner assembly.

* * * * *